No. 683,979. Patented Oct. 8, 1901.
A. N. PETIT.
DEVICE FOR MAKING DUPLICATE SOUND RECORDS.
(Application filed Dec. 8, 1900.)
(No Model.)
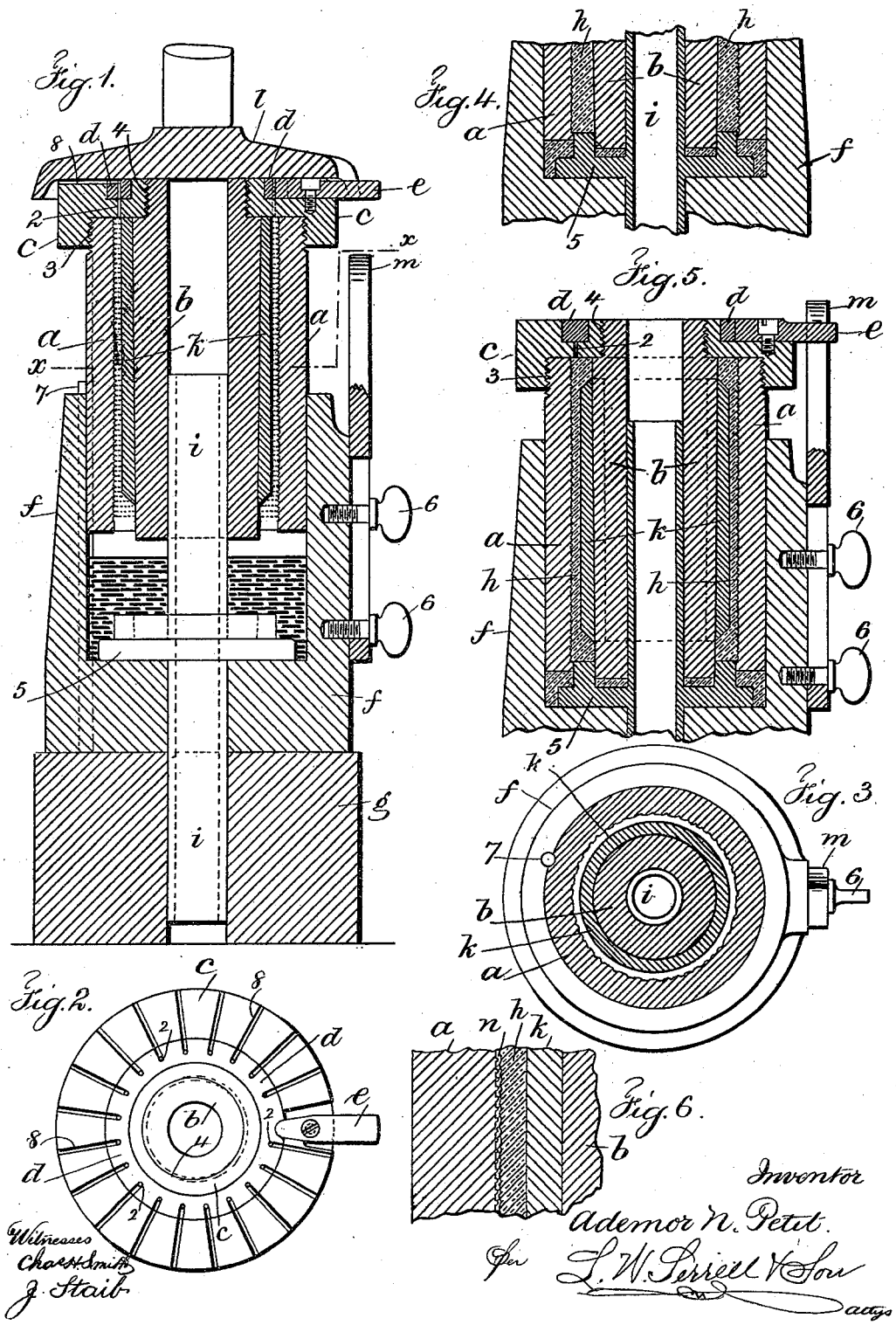
Inventor
Ademor N. Petit.

UNITED STATES PATENT OFFICE.

ADEMOR N. PETIT, OF NEWARK, NEW JERSEY, ASSIGNOR TO HIMSELF AND ALBERT O. PETIT, OF SAME PLACE.

DEVICE FOR MAKING DUPLICATE SOUND-RECORDS.

SPECIFICATION forming part of Letters Patent No. 683,979, dated October 8, 1901.

Application filed December 8, 1900. Serial No. 39,126. (No model.)

*To all whom it may concern:*

Be it known that I, ADEMOR N. PETIT, a citizen of the United States, residing at Newark, in the county of Essex and State of New Jersey, have invented an Improvement in Devices for Making Duplicate Sound-Record Cylinders, of which the following is a specification.

Heretofore phonogram-blanks have been manufactured of a wax composition cast in a mold and thereafter trued with heated tools, and the record of sound has been thereafter engraved or cut thereon, and matrices of such sound-records have been formed and duplicate records made therefrom.

My present invention relates to devices for making such duplicate sound-records. These are preferably made of cylindrical form, and the essential feature of the present invention is in so forming the duplicate sound-record within a matrix as to finish both ends of the cylinder to obviate the after-necessity of turning down or truing the ends.

According to my present invention the duplicate sound-record cylinder may be made of even thickness throughout or thicker in one part than another or with thickened ends, and I may employ a hollow core that has parallel sides or which is tapering to conform in size with the taper mandrel of a phonograph or record-reproducing machine.

I employ a matrix of a sound-record, made in any manner well-known in the art, a hollow core, and a device to which both the matrix and the hollow core are connected, a perforated hollow base, and a tubular center received within the hollow core and base and which base receives the matrix, and means for forcing the matrix and core down into the base and causing composition material therein rendered fluid by heat to flow upward between the matrix and core under pressure to fill the interstices of the matrix and when set cooled and removed to form the duplicate sound-record cylinder. I provide means for the escape of the confined air and thereafter of a small quantity of the fluid composition to prove the absence of the air, and which means are closed or shut off before final pressure is applied to consolidate the composition material, and I provide means in connection with the tubular center to pass in between the matrix and the hollow core, so as to finish complete one end of the duplicate sound-record cylinder while the other end is finished against the device or head connecting the matrix and hollow core. I may employ, surrounding the hollow core, a segmental sleeve, preferably somewhat shorter than the length of the finished duplicate sound-record cylinder and which segmental sleeve completely surrounds the hollow core, with one or both ends beveled, the office of the segmental sleeve being to reduce the thickness of a portion of the duplicate sound-record cylinder and leave one or both of the ends thickened, or, in other words, with inwardly-projecting rings or flanges, the diameter of which agrees with the mandrel of the machine, while the internal diameter of the cylinder is somewhat greater.

In the drawings, Figure 1 is a vertical section and partial elevation representing my improvement. Fig. 2 is a plan with the cap of the press removed. Fig. 3 is a cross-section at $x$ $x$ of Fig. 1. Fig. 4 is a partial vertical section representing the simpler form of my invention. Fig. 5 is a partial vertical section representing a modification, and Fig. 6 is a detached vertical section of some of the parts shown in Figs. 1 and 5 upon a larger scale.

I prepare the matrix $a$ in any manner well-known in the art—that is to say, with a substantial backing, one end of which is made with a peripheral screw-thread.

The hollow core is represented at $b$. This may be provided with parallel sides, or it may be tapering to agree in size and form with the mandrel of a phonograph or record-reproducing machine. One end of the hollow core is reduced and provided with a peripheral screw-thread.

I employ a head device $c$ with an open center and with a peripheral flange. The inner surface of the flange is made with an annular screw-surface 3 and the inner surface of the head with a screw-surface 4. The head is provided with an annular groove in the upper face to receive the ring $d$. The ring $d$ is provided with perforations at spaced-apart intervals, and the head $c$ is also provided with perforations 2, which in one position of the ring agree with the perforations therein. The surfaces of the head c and ring d are provided with radial grooves 8, which extend from the perforations in the ring to the periphery of the head. The matrix a is connected to the head at the screw-thread 3, and the hollow core b is connected to the head at the screw-thread 4, so that the hollow core occupies a position concentric to the matrix, and the said head serves to hold the matrix and hollow core in a fixed relation to one another. This ring d is provided with a notched portion in its periphery, and the head is cut away to receive a swinging arm e, connected thereto by a screw forming a pivot for the arm, and the arm is provided with a curved end bearing in the recess of the ring d, the movement of the arm serving to impart a partial rotation to the ring, it being a fact that in one position of the ring, such as shown in Fig. 1, the perforations of the head and the ring coincide, while if the arm e is moved from the position shown in Fig. 2 the ring d is partially rotated to close off the respective perforations.

A hollow base f is preferably supported upon a pedestal g, also made hollow, and the hollow base f receives the matrix a, there being by preference a guide-pin 7 passing down through a groove made in the inner surface of the hollow base, a groove being provided in the vertical surface of the matrix also to fit the guide-pin 7, so as to prevent the matrix turning in its relation to the hollow base as the same moves vertically therein.

I provide a tube i, forming a center, a part of which passes through the opening in the hollow base f and into the opening in the pedestal g and the other end of which extends upward into the opening in the hollow core b, and upon this tube i is a flanged disk 5, (shown by elevation in Fig. 1 and cross-section in Figs. 4 and 5,) the flange of the disk being of a width agreeing with the opening between the matrix and the hollow core.

A device analogous to the present has been employed by me, but therein there was no provision, as in the present, for finishing both ends of the duplicate sound-record cylinder h.

The hollow base f receives material rendered plastic or fluid by heat, and the matrix and hollow core fitting within the hollow base are forced down into the said material by the cap l of a suitable press, which cap rests above and upon the head c. In this movement as the matrix and core descend the air passes out of the perforations in the head and ring and escapes by the radial grooves 8, and the composition in a fluid or plastic state rises between the matrix and the hollow core, filling the space therein, some of the composition possibly escaping through the openings in the head and ring, and as the parts arrive at this position a cam m, vertically adjustable by clamp-screws 6, strikes the arm e, swinging the same and giving a partial rotation to the ring d, so as to move the perforations in the ring out of alinement with those in the head to cut off the composition and hold the same within the mold. The further downward movement by pressure upon the matrix and core compresses the composition material into the mold and the flange of the disk 5 passes in between the matrix a and hollow core b, thus preventing any more of the composition getting into the mold and at the same time pressing together into a firm and compact mass the composition within the mold in making the duplicate sound-record cylinder h and at the same time finishing one end of the cylinder against the under surface of the head c and the other end of the cylinder against the face of the flange of said disk. In this manner both ends of the cylinder h are finished. I prefer thereafter to pass water through the tube i to cool the hollow core and chill the composition material from inside outward, so that the same is cooled preparatory to the removal of the duplicate sound-record cylinder h from the parts in any suitable or desired manner, and in which the head c is simultaneously separated from the matrix a and the core b at the screw-threads 3 4. I prefer to employ, in connection with this device by which both ends of the duplicate sound-record cylinder h are simultaneously finished, a segmental sleeve k, surrounding the hollow core b and made shorter than the matrix. One or both ends of the segmental sleeve are tapered. In Fig. 1 I have shown one end as tapered, while in Fig. 5 both ends are shown as tapered. Where one end is tapered, the duplicate sound-record cylinder h is made thinner in the portion coming between the segmental sleeve k and the matrix, and the end adjacent to the flanged disk 5 is made of full thickness between the matrix and core, so that this latter end is thickened or made with a flange, the opening in which agrees with the diameter of the mandrel. Both ends may be made with thickened portions or rings, as shown in Fig. 5, in which the segmental sleeve k is shorter with both ends tapered, and in this case the duplicate sound-record cylinder h is provided with its respective ends made thicker or with flanges, the central portion being within of greater diameter than the ends, but with sufficient strength and rigidity for service. In any event both ends of the duplicate sound-record cylinder h are finished, so as to require no after turning down or treatment, one end being finished against the under surface of the head c and the other against the surface of the flange of the disk 5.

In the modification shown in Fig. 6 I have shown at n a film upon the surface of the matrix a, as it is possible in my present invention to first form a film upon the matrix and afterward, as hereinbefore described, to force the fluid composition material up into the mold past the film and by pressure and heat to cause the film and composition to adhere, so that the finished sound-record cylinder has a film-surface in which is the record and the foundation or body of inferior or cheaper material, the parts being united by adhesion under heat and pressure. In this connection, however, it is preferable that the foundation material have in its composition a material of a solvent nature bearing a close relation to the materials of the film, so that the union of the film and composition will be chemical as well as mechanical. The film is preferably composed of celluloid or a composition of pyroxylin and other suitable materials, and the foundation is preferably composed of pyroxylin, camphor, and a greater quantity of a pigment—such as zinc-white, kaolin, baryta, magnesium, red lead, colored mineral earth, or similar suitable materials—which by reason of their presence and bulk cheapen the material forming the foundation.

The segmental sleeve $k$ may consist of any desired or advantageous number of parts held together and to the hollow core $b$ in any suitable manner, it being necessary to support the sleeve $k$ upon and by the said core; but the same forms no part of the present invention.

I do not herein limit myself to the composition of the material rendered fluid or plastic by heat and employed for making the duplicate sound-record nor to the material of which the film is composed.

I claim as my invention—

1. The combination with a matrix, a hollow core and a device to which the said parts are connected at one end, of a hollow base adapted to receive the matrix and composition material rendered fluid or plastic by heat, a tube forming a center and passing into the opening in the hollow base and up into the hollow core, a disk connected to said tube within the hollow core and adjacent to the inner surface thereof and having an annular flange agreeing in width and in diameter with the lower end of the space between the matrix and hollow core, substantially as and for the purposes set forth.

2. The combination with the matrix having a screw-thread at one end and a hollow core reduced and having a screw-thread at one end, of a head having an open screw-threaded center to receive the hollow core, and to which the same is connected, and an internally-threaded flange to which the matrix is connected so that the hollow core is concentric to the matrix and the under surface of the head closes the annular opening between the matrix and hollow core at one end, a hollow base receiving the matrix and hollow core and the annular flange adapted to pass between the matrix and hollow core at the end opposite to that occupied by the connecting-head, substantially as and for the purposes set forth.

3. The combination with the matrix having a screw-thread at one end and the hollow core reduced and having a screw-thread at one end, of a head having a series of perforations an open screw-threaded center to receive the hollow core and to which the same is connected, and an internally-threaded flange to which the matrix is connected so that the hollow core is concentric to the matrix and the under surface of the head closes the annular opening between the matrix and hollow core at one end, a ring having spaced-apart perforations and received in an annular groove in the outer surface of the head concentric to the hollow core, the perforations in the ring agreeing normally with perforations in the head, means for imparting a partial rotation to the ring to close off the perforations, a hollow base within which the matrix and hollow core are received, a tube passing down through the hollow base and up into the hollow core, and a disk surrounding and connected to the tube and lying against the inner horizontal surface of the hollow base, and an annular flange formed with and rising from the said disk and agreeing in width and diameter with the opening between the matrix and hollow core at the ends thereof opposite to the head, and means for forcing down the matrix and hollow core into the hollow base so as to force up between the matrix and hollow core material in the base rendered fluid or plastic by heat to form between the matrix and hollow core a duplicate sound-record cylinder with finished ends, substantially as set forth.

4. The combination with the matrix having a screw-thread at one end and the hollow core reduced and having a screw-thread at one end, of a head having a series of perforations an open screw-threaded center to receive the hollow core and to which the same is connected, and an internally-threaded flange to which the matrix is connected so that the hollow core is concentric to the matrix and the under surface of the head closes the annular opening between the matrix and hollow core at one end, a segmental sleeve surrounding the hollow core and shorter in length than the length of the matrix and having at least one end tapered, a ring having spaced-apart perforations and received in an annular groove in the outer surface of the head concentric to the hollow core, the perforations in the ring agreeing normally with perforations in the head, means for imparting a partial rotation to the ring to close off the perforations, a hollow base within which the matrix and hollow core are received, a tube passing down through the hollow base and up into the hollow core, and a disk surrounding and connected to the tube and lying against the inner horizontal surface of the hollow base and an annular flange formed with and rising from the said disk and agreeing in width and diameter with the opening between the matrix and hollow core at the ends thereof opposite to the head, and means for forcing down the matrix and hollow core into the hollow base so as to force up between the matrix and hollow core material in the base rendered fluid or plastic by heat to form between the matrix and hollow core a duplicate sound-record cylinder with finished ends, substantially as and for the purposes set forth.

5. The combination with the matrix having a screw-thread at one end and a hollow core reduced and having a screw-thread at one end, of a head having screw-threaded portions to receive the hollow core and the matrix and to which the same are connected so that the hollow core is concentric to the matrix and the under surface of the head closes the annular opening between the matrix and hollow core at one end, a segmental sleeve surrounding the hollow core and shorter in length than the length of the matrix and having at least one end tapered, a hollow base within which the matrix and hollow core are received, a tube filling the axial center of the hollow core and hollow base, a disk having an integral annular flange rising from the same and which flange agrees in width and diameter with the opening between the matrix and hollow core at the ends thereof opposite to the head, said disk being connected to said tube and within the hollow base against the horizontal inner surface thereof, whereby in the forming of the duplicate sound-record cylinder the flange of said disk passes in between the matrix and hollow core to finish one end of the duplicate sound-record cylinder while the other end is finished against the under surface of the head, substantially as and for the purposes set forth.

Signed by me this 3d day of December, 1900.

ADEMOR N. PETIT.

Witnesses:
GEO. T. PINCKNEY,
BERTHA M. ALLEN.